(12) United States Patent
Yoshikawa et al.

(10) Patent No.: US 6,275,336 B1
(45) Date of Patent: *Aug. 14, 2001

(54) OPTICAL ISOLATOR

(75) Inventors: Hiroki Yoshikawa; Toshiaki Watanabe; Toshihiko Ryuo, all of Gunma (JP)

(73) Assignee: Shin-Etsu Chemical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/902,882

(22) Filed: Jul. 30, 1997

(30) Foreign Application Priority Data

Jul. 30, 1996 (JP) ...................................................... 8-200088
Jun. 23, 1997 (JP) ...................................................... 9-181738

(51) Int. Cl.$^7$ ............................... G02B 27/28; G02F 1/09
(52) U.S. Cl. .......................................... 359/484; 359/282
(58) Field of Search ...................................... 359/484, 495, 359/496, 497, 281, 282; 372/703

(56) References Cited

U.S. PATENT DOCUMENTS

| | | | |
|---|---|---|---|
| 4,679,918 | * 7/1987 | Ace ........................................ 351/163 |
| 5,341,235 | * 8/1994 | Watanabe et al. .................... 359/281 |
| 5,452,122 | * 9/1995 | Tsuneda et al. ...................... 359/281 |
| 5,573,833 | * 11/1996 | Imamura et al. ..................... 428/195 |

* cited by examiner

Primary Examiner—Cassandra Spyrou
Assistant Examiner—Jared Treas
(74) Attorney, Agent, or Firm—Reed Smith LLP

(57) ABSTRACT

Herein provided is an optical isolator which permits the reduction of the production cost and which is excellent in the thermal shock resistance.

The optical isolator of the present invention is that the Farady rotator be adhered to the birefringent crystals or glass polarizers through adhesive layers and that the glass transition point of the adhesive be not more than −40° C.

4 Claims, 3 Drawing Sheets

OPTICAL ISOLATOR

BACKGROUND OF THE INVENTION

The present invention relates to an optical isolator which is positioned between a semiconductor laser as a light source and a light-transmitting part, for instance, in an optical transmission system to thus prevent a laser beam reflected by the optical transmission part from returning to the light source.

A copper wire conductor had been used in the information transmission and, recently, the information is transmitted by an optical fiber in the telecommunication by personal computer and the like on behalf of multimedia because the improvement in the capacity of the information transmission is desired and thus an optical fiber has larger transmission than a copper wire conductor. The base part of the telecommunication line has almost finished exchanging for the optical fiber. Though the branch part is under exchanging, the capacity of the information transmission in the branch part may be smaller than that of the base part because the optical fiber is more expensive than the copper wire conductor.

An optical isolator, which is the device of an optical fiber system to prevent a laser beam reflecting on an optical fiber face to a semiconductor light source, is required cheaper. However, optical elements incorporated into the optical isolator are often formed from expensive materials such as oxide single crystals. Moreover, the precision must strictly be controlled when combining such elements. As has been explained above, the production cost of the optical isolator increases because of high cost of assembly thereof and costs required for parts such as a holder.

As a means for saving the cost for assembly, there has been known a method which comprises adhering, in advance, optical elements to one another and then cutting it into pieces having a desired size. However, the optical isolator assembled according to this method is insufficient in the resistance to thermal shock and the adhered plane thereof easily undergoes peeling off due to temperature change. For this reason, if such an optical isolator is used over a long period of time, the quality thereof is impaired

SUMMARY OF THE INVENTION

The present invention has been developed for solving the foregoing problems and an object of the present invention is, accordingly, to provide an optical isolator which permits the reduction of the production cost and which is excellent in the thermal shock resistance.

The optical isolator of the present invention comprises a Farady rotator and birefringent crystals or glass polarizers, whereby the Farady rotator be adhered to the birefringent crystals or glass polarizers through adhesive layers and that the glass transition point of the adhesive be not more than $-40°$ C.

The optical isolator of the other embodiment of the present invention comprises a Farady rotator and birefringent crystals or glass polarizers, whereby the Farady rotator is adhered to the birefringent crystals or glass polarizers through adhesive layers, the adhesive has rubber elasticity in 10 to $40°$ C., the thickness of the adhesive layer is 10 to 100 $\mu$m, the area of optical plane in the optical isolator is not more than 2 mm$^2$.

DETAILED EXPLANATION OF THE INVENTION

Figure 1:
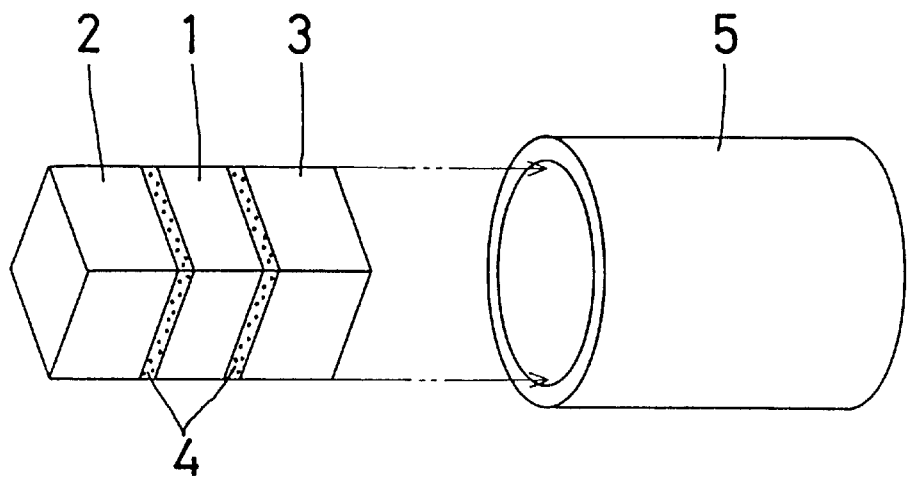
FIG. 1 is an exploded view showing an embodiment of the optical isolator according to the present invention.

The optical isolator of the present invention which has been developed to achieve the foregoing object is, as shown in FIG. 1, that the Farady rotator 1 be adhered to the birefringent crystals 2, 3 or glass polarizers 2, 3 through adhesive layers 4 and that the glass transition point of the adhesive 4 be not more than $-40°$ C.

The principal component of the adhesive 4 is preferably a silicone resin. The silicone resin-containing adhesive has a low glass transition point and exhibits rubber elasticity. In addition, it is also excellent in the heat resistance and resistance to chemicals. Specific examples of such silicone resins are thermoplastic modified silicone resins and photo-setting modified silicone resins.

The birefringent crystals 2, 3 are desirably single crystal of titanium oxide (rutile). The rutile single crystal is suitable for use in the production of an optical isolator having a large difference in birefringency and excellent in extinction characteristics.

As materials for polarizer 2 or 3, polarizing beam splitters and polarizing glass are suitable because of excellent extinction characteristics.

A material preferred for the Farady rotator 1 is a thin film of Bi-substituted garnet (epitaxial films) and a single crystal of yttrium-iron-garnet.

The optical isolator of the other embodiment of the present invention which has been developed to achieve the foregoing object is, as shown in FIG. 2, that the Farady rotator 13 be adhered to the birefringent crystals 11, 12 or glass polarizers 11, 12 through adhesive layers and that the adhesive has rubber elasticity in 10 to $40°$ C., the thickness of the adhesive layer is 10 to 100 $\mu$m, the area of optical plane in the optical isolator is not more than 2 mm$^2$.

The such preferred adhesive is epoxy resins, (meta)acrylic resins or/and fluorine modified resins in addition to silicone resins.

Examples concerning preferred embodiments of the present invention will hereinafter be described in detail, but the present invention is not restricted to these specific Examples at all.

FIG. 1 is an exploded view showing an embodiment of the optical isolator according to the present invention. As shown in this figure, a Farady rotator 1 is sandwiched between two birefringent crystals 2, 3 and adhered thereto through adhesive layers 4. The adhered body of the birefringent crystals 2, 3 and the Farady rotator 1 is inserted into a cylindrical magnet 5. The adhesive 4 is transparent and has a glass transition point of not more than $-40°$ C.

The light ray incidenting upon the optical isolator is divided into two rays which are an ordinary light ray and extraordinary light ray. Two divided light rays are incident upon the Farady rotator 1, the polarization of the light rays are rotated at an angle of $45°$. The light rays are incident upon the birefringent crystal 3, coupled, and the light rays pass through the birefringent crystal 3.

The reflected light ray incident upon the birefringent crystal 3 is divided into two rays which are an ordinary light ray and extraordinary light ray. Two divided light rays are incident upon the Farady rotator 1, the polarization of the light rays are rotated at an angle of 45°. The light rays are incident upon the birefringent crystal 2. Because the distance between two divided light rays is spread more, the divided light rays never return to the light source (not shown).

After carrying out a test for the thermal shock resistance while changing the kinds of the adhesives used, there was produced the optical isolator, and that performance was estimated. These test experiments was below.

Test for Thermal Shock Resistance of Adhesives

Alumina, silica and titania were deposited, as an antireflection coat, on the surface of a gadolinium-gallium-garnet (GGG) single crystal and bismuth (Bi)-substituted garnet epitaxial thick film by the vacuum deposition technique, followed by adhering these parts using a transparent adhesive to thus form 8 kinds of test samples (a to h). The principal components of the adhesives are silicone resins, methacrylic resins, urethane-modified acrylic resins and epoxy resins. The test was carried out at a high temperature of 85° C., a low temperature of −40° C. and a cycle number of 15, according to the MIL-STD-833 Test Method 1011.4. After the completion of the test, the adhered plane of each sample was microscopically observed to inspect the sample for the presence of any peeling. The results thus obtained are summarized in Table 1 given below:

TABLE 1

| Sample | Prin. Comp. of Adhesive | $T_G$[1] (° C.) | Setting Method | Refr. Ind. | Results of Observation |
|---|---|---|---|---|---|
| a | silicone resin | −60 | UV(10J/cm$^2$) | 1.492 | No Peeling |
| b | silicone resin | −50 | UV(10J/cm$^2$) | 1.493 | No Peeling |
| c | silicone resin | −40 | thermosetting (150° C., 4 hr) | 1.514 | No Peeling |
| d | silicone resin | −70 | thermosetting (150° C., 4 hr) | 1.410 | No Peeling |
| e | methacrylic resin | 112 | UV(10J/cm$^2$) | 1.510 | partial peeling |
| f | methacrylic resin | −26 | UV(10J/cm$^2$) | 1.490 | partial peeling |
| g | urethane-modified acrylate resin | 105 | visible light (10J/cm$^2$) | 1.519 | scattered fine peeling |
| h | epoxy resin | 140 | thermosetting (150° C., 4 hr) | 1.494 | partial peeling |

[1] Glass transition temperature.

The data listed in Table 1 clearly indicate that adhesives a to d having a glass transition point of not more than −40° C. are excellent in the thermal shock resistance and that preferred principal components for adhesives are silicone resins.

Test Experiment 1

Then a Farady rotator was sandwiched between two rutile single crystals and coupled thereto through adhesive layers to give a sample of the polarization-independent type optical isolator and optical characteristics thereof were evaluated. The rutile single crystal had a height of 11 mm, a width of 11 mm and a thickness of 1 mm; the Farady rotator was made from bismuth-substituted garnet and had a height of 11 mm, a width of 11 mm and a thickness of 0.4 mm. An alumina film and a titania film as antireflection coats were formed on every faces thereof according to the vacuum deposition technique. The Farady rotator and the rutile single crystals were adhered using a silicone thermosetting adhesive (whose glass transition point was −70° C.), followed by cutting the adhered body into pieces having a height of 2 mm and a width of 2 mm and insertion thereof into a cylindrical magnet to give a polarization-independent type optical isolator. Five kinds of such optical isolator samples (Sample Nos. 1 to 5) were produced, subjected to a test for thermal shock resistance. Moreover, the optical insertion losses thereof were determined before and after the foregoing test. The test for thermal shock resistance was carried out at a high temperature of 85° C., a low temperature of −40° C. and a cycle number of 15, according to the MIL-STD-833 Test Method 1011.4. The results thus obtained are summarized in Table 2 given below.

Comparative Experiment

The same procedures used in Test Experiment 1were repeated except for using an epoxy type adhesive having a glass transition temperature of 140° C. to thus form optical isolator samples (Sample Nos. 6 to 10) and the samples were inspected for their optical insertion losses. The results thus obtained are summarized in Table 2.

TABLE 2

| | Optical Insertion Loss (dB) | | | | |
|---|---|---|---|---|---|
| Silicone Adhesive | Before Test | After Test | Epoxy Adhesive | Before Test | After Test |
| Sample No. 1 | 0.199 | 0.207 | Sample No. 6 | 0.187 | 0.421 |
| 2 | 0.223 | 0.218 | 7 | 0.180 | 0.560 |
| 3 | 0.201 | 0.185 | 8 | 0.211 | 0.302 |
| 4 | 0.215 | 0.208 | 9 | 0.214 | 0.446 |
| 5 | 0.202 | 0.220 | 10 | 0.205 | 0.582 |
| Averaged Value | 0.208 | 0.208 | Averaged Value | 0.199 | 0.462 |

As will be clear from the data listed in Table 2, all of the optical isolators prior to the test had an optical insertion loss of about 0.2 dB and accordingly, there is not any practical difficulty with these isolators prior to the application of heat. However, the optical isolators which make use of an epoxy adhesive (Sample Nos. 6 to 10) exhibit high optical insertion losses observed after the test. Contrary to this, it has been confirmed that the optical isolators produced using a silicone adhesive (sample Nos. 1 to 5) exhibit only a slight change in the optical insertion loss before and after the test for thermal shock resistance and that these samples are excellent in the thermal shock resistance.

Test Experiment 2

A polarization-dependent type optical isolator was produced and the optical insertion loss thereof was determined. More specifically, a polarizer and a bismuth-substituted garnet plate were adhered to one another through a silicone adhesive layer and then another polarizer was incorporated into the assembly without using any adhesive while variously adjusting the angle thereof to give 5 kinds of samples (Sample Nos. 11 to 15). These Sample Nos. 11 to 15 were inspected for the optical insertion loss. The results thus obtained are summarized in the following Table 3. Incidentally, measured values for Sample Nos. 1 to 5 obtained in Test Experiment 3 are also listed in Table 3 by way of comparison.

On the other hand, 5 kinds of isolators (Sample Nos. 16 to 20) were also produced by sandwiching a bismuth-substituted garnet plate between two polarized and adhered thereto through a silicone adhesive layers. These Sample Nos. 16 to 20 were inspected for the optical insertion loss. The results thus obtained are summarized in Table 3.

TABLE 3

| Optical Insertion Loss (dB) | | | | | |
|---|---|---|---|---|---|
| Polarization-Ind. Type | | Polarization-Dependent Type | | | |
| Rutile/Garnet/Rutile | | Polar.[1)]/Garnet | | Polar./Garnet/Polar. | |
| Sample 1 | 0.199 | Sample 11 | 0.182 | Sample 16 | 0.254 |
| No. 2 | 0.223 | No. 12 | 0.168 | No. 17 | 0.195 |
| 3 | 0.201 | 13 | 0.172 | 18 | 0.274 |
| 4 | 0.215 | 14 | 0.195 | 19 | 0.287 |
| 5 | 0.202 | 15 | 0.188 | 20 | 0.199 |
| Av. Value | 0.208 | Av. Value | 0.181 | Av. Value | 0.243 |
| S.D.[2)] | 0.010 | S.D. | 0.011 | S.D. | 0.043 |

[1)]Abbreviation of "Polarizer"
[2)]Standard deviation.

The data listed in Table 3 indicate that the scatter (standard deviation) of the optical insertion losses observed for Sample Nos. 16 to 20 is greater than that of the optical insertion losses observed for Sample Nos. 11 to 15. This fact suggests that, when producing a polarization-dependent type isolator, it is preferred to adhere the Farady rotator and one of the polarizers through an adhesive layer while the other polarizer is kept in a condition which permits the fine adjustment.

The standard deviation observed for Sample Nos. 1 to 5 is very small. Therefore, it has been confirmed that these samples permit the efficient production of high quality polarization-independent type optical isolators by sandwiching a Farady rotator between two rutile plates, adhering the former to the latter and cutting the resulting assembly into pieces having a desired size.

Test Experiment 3

Figure 2A:
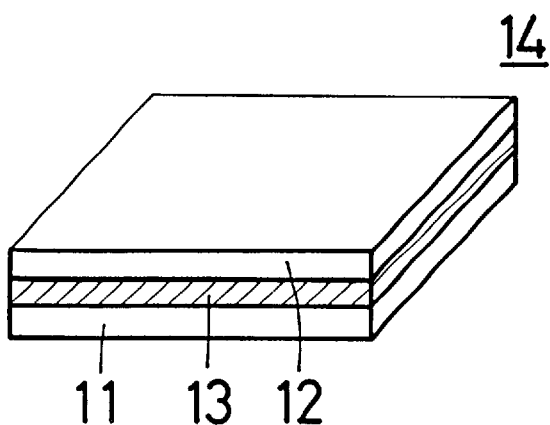
FIGS. 2A–2D are perspective views showing the manufacturing process of another embodiment of the optical isolator according to the present invention.
Figure 2B:
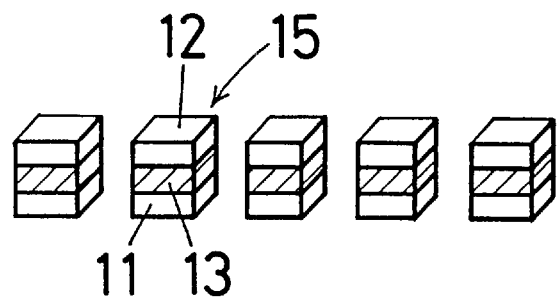
Figure 2C:
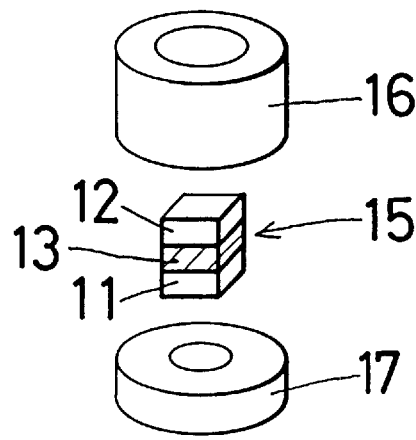
Figure 2D:
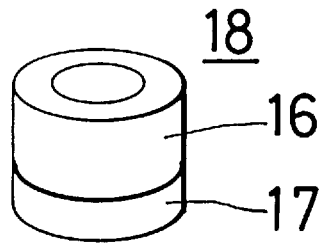

FIGS. 2A–2D are perspective views showing the manufacturing process of the optical isolator. As shown in FIG. 2A, the Farady rotator 13 is sandwiched between the birefringent crystals 11, 12 or the glass polarizers 11, 12 and adhered thereto through adhesive layer, to thus be produce a large element 14. Thus the large element 14 is cut in desired size as shown in FIG. 2B, to thus be produce some element chips 15. A element chip 15, a magnet 16 and a metal holder 17 are put together as shown in FIG. 2C, to thus be produce a optical isolator as shown in FIG. 2D.

It was used for the glass polarizers 11, 12 that Polarcore 1.3 μm, 15× 15 mm made in Coning co. covered with anti-reflecting coating for air and anti-reflecting coating for adhesive. It was used for the Farady rotator 13 that (Bi)-substituted-rare-earth-iron-garnet($\theta f=45°$ at 1.31 μm) 15×15 mm covered with anti-reflecting coating for adhesive on both sides. Silicone series double fluid thermosetting resin was used for the adhesive. The glass transition point of the adhesive was −45° C., and the adhesive had rubber elasticity at −45° C. to 250° C.

These optical elements were adhered as below.

First, the plane of anti-reflecting coating for adhesive the first glass polarizers 11 was adhered temporarily to the Farady rotator 13 with the adhesive (condition of thermo-setting: 150° C., 10 minutes, in atmosphere), the element of the first glass polarizers 11/the Farady rotator 13 was produced. Then, the adhesive was dripped on the plane of anti-reflecting coating for adhesive the second glass polarizers 12, the Farady rotator 13 plane in the element of the first glass polarizers 11/the Farady rotator 13 was adhered to the second glass polarizers 12, the element 14 of the first glass polarizers 11/the Farady rotator 13/the second glass polarizers 12 was produced. After the adhesive reached the whole adhered plane, the adhesive was thermoset in the condition of 150° C., 6 hours, in atmosphere.

The sample element 14 was produced by the foregoing means as the thickness of the adhesive layer was 2 to 200 μm.

The sample element 14 was fixed on a glass table with wax, and cut by a die. The sizes of cutting was 0.49 to 4 mm². After cutting, the elements 15 was taken off from the glass table, the adhered plane was microscopically observed to inspect for the presence of any peeling.

Figure 3:
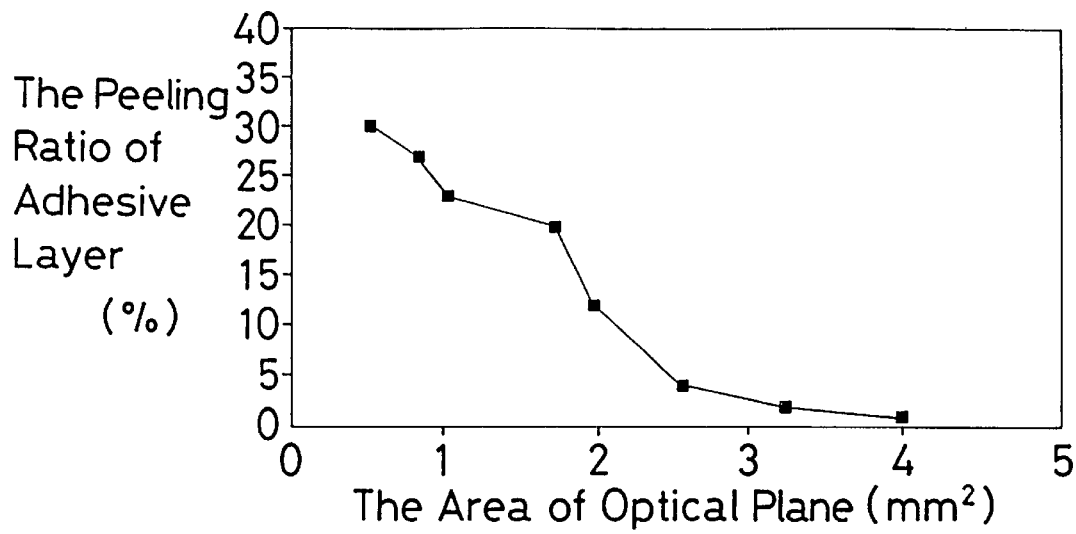
FIG. 3 is a graph showing a relation between the area of optical plane and the peeling ratio of adhesive layer in the optical isolator.
Figure 4:
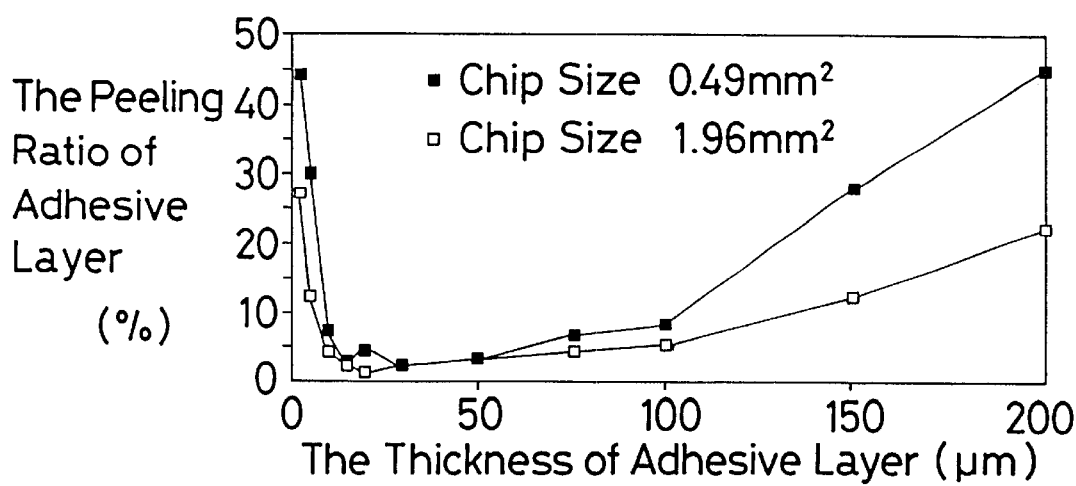
FIG. 4 is a graph showing a relation between the thickness of adhesive layer and the peeling ratio of adhesive layer in the optical isolator.

It has been confirmed for the results that in case of changing the size of cutting while the thickness of the adhesive layer was fixed at 5 μm, as shown in FIG. 3, it has been confirmed that the peeling of the adhesive layer increases when the size of cutting is not more than 2 mm². Then, the chips were cut as the sizes of cutting were and 2 mm² in while the thickness of the adhesive layers were 2 to 200 μm, and the adhered planes were inspected for the presence of any peeling. As shown in FIG. 4, it has been confirmed that the yield of cutting is over 90% in while the thickness of the adhesive layer is 10 to 100 μm. In addition, it has been confirmed for the excellent results that the yield of cutting is over 95% in while the thickness of the adhesive layer is 15 to 50 μm.

As foregoing detailed explanation, the use of a transparent adhesive having a glass transition temperature of not more than −40° C. for adhering a Farady rotator and birefringent crystals used for the production of an optical isolator permits the absorption or relief of any stress probably generated due to the difference between the thermal expansion coefficients of the Farady rotator and the birefringent crystals, through the deformation of the adhesive since the adhesive having a glass transition point of not more than −40° C. (temperature of preservative environment for the optical isolator) possesses rubber elasticity (entropy elasticity). For this reason, the resulting optical isolator is free of any stress concentration at the adhered boundaries and accordingly, the Farady rotator is not peeled off from the birefringent crystals and the desired quality of the optical isolator is maintained over a long time period. In addition, the production cost of the optical isolator can be reduced by adhering a Farady rotator and birefringent crystals through adhesive layers and then cutting the adhered body into pieces having a desired size.

In addition, the use of the adhesive layer which has rubber elasticity and the thickness of 10 to 100 μm permits, in case of producing an optical isolator which an optical plane is cut into the size of not more than 2 mm², rare peeling of the adhered plane and improvement of the cutting yield.

What is claimed is:

1. An optical isolator comprising a Farady rotator and birefringent crystals or glass polarizers, whereby the Farady rotator is adhered to the birefringent crystals or glass polorizers through thermo-setting or photo-setting modified silicone adhesive layers, wherein the glass transition point of the adhesive is not more than −40° C.

2. The optical isolator according to claim 1, wherein the silicon adhesive layers each have a rubber elasticity in the temperature range of 10° C.–40° C.

3. The optical isolator according to claim 1, wherein each of the silicon adhesive layers has a thickness from 10 to 100 μm.

4. The optical isolator according to claim 1, wherein the optical isolator has an area of optical plane not more than 2 mm².

* * * * *